No. 727,550. PATENTED MAY 5, 1903.
H. G. MINCK.
APPARATUS FOR STOPPING RUNAWAY HORSES.
APPLICATION FILED SEPT. 20, 1902.
NO MODEL.
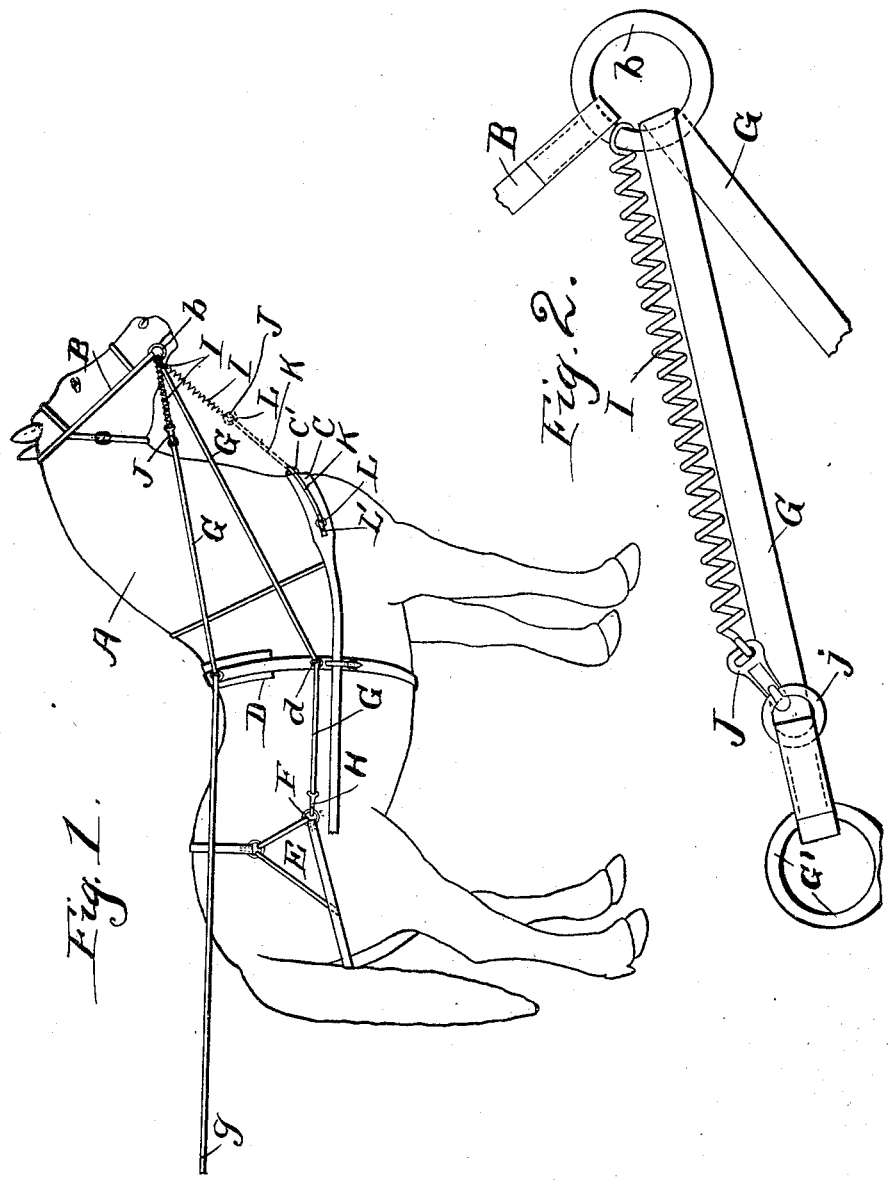
Witnesses:
G. S. Noble
Augusta Deth
Inventor,
Hermann G. Minck,
By Charles Turner Brown,
Att'y.

No. 727,550.

Patented May 5, 1903.

UNITED STATES PATENT OFFICE.

HERMANN G. MINCK, OF CHICAGO, ILLINOIS, ASSIGNOR OF TWO-THIRDS TO HENRY SCHWARTZ AND ISAAC GREENBLATT, OF CHICAGO, ILLINOIS.

APPARATUS FOR STOPPING RUNAWAY HORSES.

SPECIFICATION forming part of Letters Patent No. 727,550, dated May 5, 1903.

Application filed September 20, 1902. Serial No. 124,179. (No model.)

*To all whom it may concern:*

Be it known that I, HERMANN G. MINCK, a citizen of the United States of America, residing at Chicago, in the county of Cook and State of Illinois, have invented certain new and useful Improvements in Apparatus for Stopping Runaway Horses, of which the following, when taken in connection with the drawings accompanying and forming a part hereof, is a full and complete description, sufficient to enable those skilled in the art to which it pertains to understand, make, and use the same.

This invention relates to an apparatus whereby a horse will be restrained from running away when left standing in the street, particularly if left standing by the side of the curb, without a hitching weight and strap and without being hitched to a post or other object on the street; and also it relates to an apparatus whereby when a horse attempts to run away while being driven along the street it may be stopped and prevented from so doing by the person driving the same, even though such person be a woman or boy.

The object of the invention is to obtain an apparatus for the purposes set forth which will be sightly in appearance, simple in construction, inexpensive in its first cost, not liable to get out of order or be broken, and readily understood and operated by those in charge of a horse or driving the same.

In the drawings referred to as illustrating the invention in this specification, Figure 1 is a side elevation showing a horse with the harness embodying this invention placed thereon; and Fig. 2 is a side elevation, on an enlarged scale, of the bit-ring of the harness and of the parts of the apparatus connected to the bit-ring.

A reference-letter applied to designate a given part is used to indicate such part throughout the several figures of the drawings wherever the same appears.

A illustrates a horse.

B is the bridle of a harness, and $a$ the bit-rings of the bridle.

C is the breast-strap of a harness; C', a post or ring in breastplate C.

D is the girth-strap of a harness, and $d$ is a post or ring attached thereto.

E is the breeching of the harness.

F is a breeching-ring.

G is a strap provided at one end thereof, with the snap-hook H detachably engageable with breeching-ring F. The strap G passes through the ring or post $d$, through the bit-ring $b$, and from thence to the hands of the person driving the horse, as at $g$.

In order to permit the use of ordinary lines in a harness embodying this invention, the ring G' is interposed in strap G adjacent to the ring $j$, and the snap-hooks of ordinary harness-lines may be engaged with such ring G'. The strap G may be drawn back and forth through the bit-ring $b$. One end of the spring I is attached to bit-ring $b$ and the other end thereof is removably attached by the snap-hook J to ring $j$ on strap G. When the horse is to be guided by the lines, the strain or pull thereon is transmitted to the bit-rings of the bridle through the spring I. Such springs (one to each bit-ring of the bridle) have a sufficient number of coils and sufficient elasticity, so that the line G may be drawn through the bit-ring $b$ and through the girth post or ring $d$ to bring the breeching of the harness into close contact with the horse. When a horse attempts to run away and the lines G G are drawn taut, as above described, by the action of running, the head of the horse will be drawn downward and the hind legs of such horse will be drawn forward, the force exerted on the bit-ring $b$ being substantially double the force applied to the lines by the person driving the horse.

L is a strap fastened at one end thereof to the post or ring C' of the breastplate C of the harness and at the other end provided with a ring adapted to removably engage with the snap-hook L'. When it is desired to leave the horse standing, the snap-hook J is disengaged from the ring $j$, (see Fig. 2,) the ring L is disengaged from the snap-hook L', and such snap-hook J and ring L are brought into engagement, as is indicated by dotted lines in Fig. 1 of the drawing. In the engagement of snap-hook J and ring L the spring I is stretched, so as to draw the breastplate C loose on the horse or to cause the horse to step back in the breastplate, leaving the traces of the harness loose. In case the horse attempts to start, the drawing of the breastplate of the horse back by the tightening of the traces of the harness will give a pull to the bit-ring b, to which the spring I is attached. When the horse is left at the side of the road, the spring I which is adjacent to the curb is the one which is attached to ring L of strap K, and hence the pull, as hereinbefore described, will be on the bit-ring, tending to guide the horse into the curb of the street or fence of the road. The intimation thus given to the horse that he should not start is in nearly every case sufficient to prevent the horse from running away when left standing.

In a harness for a horse not requiring to driven with tight lines the springs I I may be omitted from the apparatus, if preferred.

The post or ring C may be attached to a collar, as well as to the breastplate of a harness.

Having thus described my invention, what I claim as new, and desire to secure by Letters Patent, is—

1. The combination of a breeching-strap, bit-rings, springs respectively attached to the bit-rings, straps attached to the breeching-strap and extending through the bit-rings and back to constitute driving-lines and connections between the springs and the straps forming the driving-lines; substantially as described.

2. The combination of a breeching-strap, bit-rings, straps attached at one end to the breeching-strap and extending therefrom through the respective bit-rings, rings attached to the free ends of the respective straps, springs connected to the bit-rings and to the ringed ends of the straps respectively and driving-lines attachable to the respective rings on such straps; substantially as described.

3. The combination of a breeching, bit-rings, a strap attached at one end to the harness, springs respectively attached at one end to the bit-rings and detachably attached to the driving-lines, driving-lines, such springs arranged so that the detachable ends thereof may be, respectively, attached to the free end of the strap attached to the harness, and such springs arranged to receive the strain of the traces of the harness in the forward movement of a horse when the spring and the strap are connected together and to the harness on the horse; substantially as described.

HERMANN G. MINCK.

In presence of—
 HENRY SCHWARTZ,
 I. GREENBLATT.